March 2, 1948.  N. B. MEARS ET AL  2,437,228
RETICLE
Original Filed Aug. 5, 1943   2 Sheets-Sheet 1
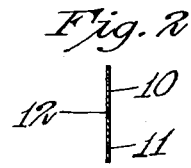
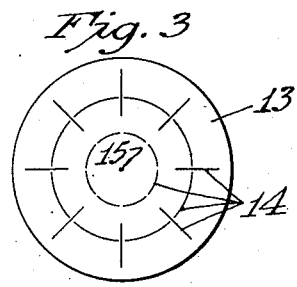
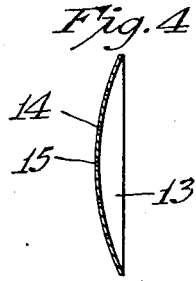
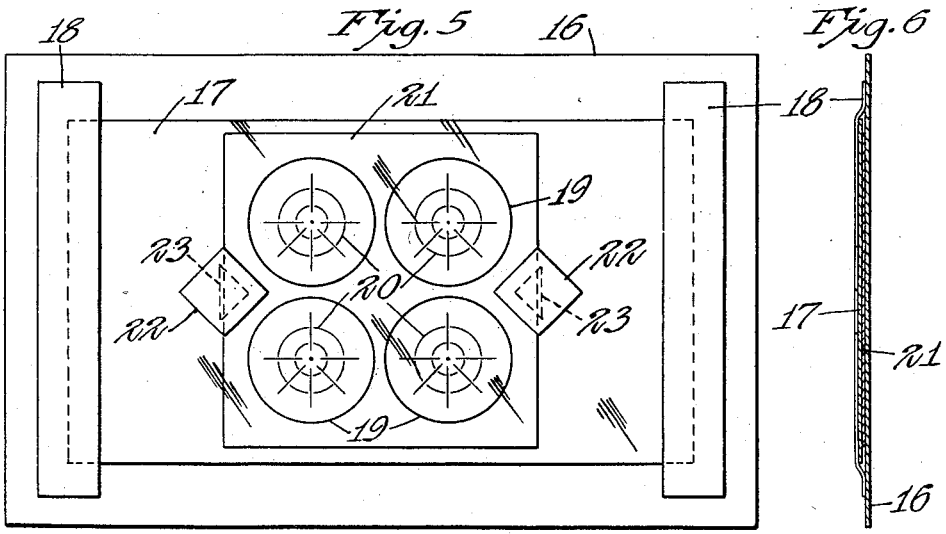
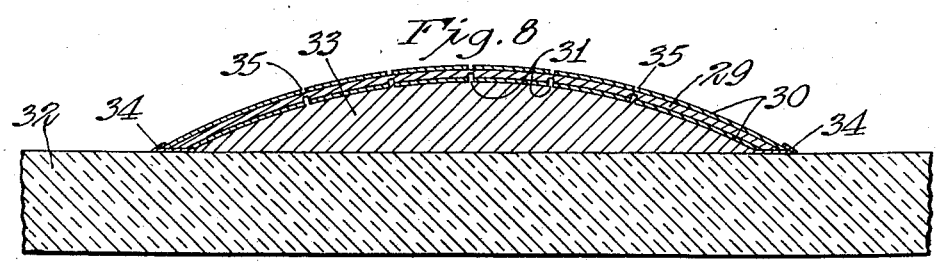
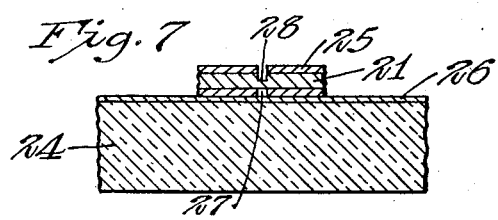
Inventors
Norman B. Mears
Harvey T. Holsapple
By John E. Stryker Jr.
Attorney March 2, 1948. N. B. MEARS ET AL 2,437,228
RETICLE
Original Filed Aug. 5, 1943 2 Sheets-Sheet 2

Inventors
Norman B. Mears
Harvey T. Holsapple
By John E. Stryker Jr.
Attorney

Patented Mar. 2, 1948

2,437,228

UNITED STATES PATENT OFFICE 2,437,228

RETICLE

Norman B. Mears, West St. Paul, Minn., and Harvey T. Holsapple, New Rochelle, N. Y., assignors to Buckbee-Mears Company, St. Paul, Minn., a corporation of Minnesota Original application August 5, 1943, Serial No. 497,486. Divided and this application February 15, 1944, Serial No. 522,452. In Canada October 13, 1943

6 Claims. (Cl. 33—51)

This invention relates to reticles for optical instruments and particularly to those for gun sights or other ordnance fire control instruments wherein a network of lines or design is transparent and the field or background is opaque. In order to meet modern requirements of accuracy, the reticles for such instruments must have apertures defining lines of fineness on the order of .001 to .01 inch in width.

Our improved reticles are formed from metal sheets of sufficient thickness to be self-sustaining when supported only at their peripheries or perimeters in the particular instruments for which they are intended. The designs comprising fine, transparent lines or perforations are located with accuracy controlled within 2/10,000 of an inch and clearcut, uniform lines as fine as 1/1000 of an inch in width may be produced when required. In gun sights and other fire control instruments artificial light is projected from one side of the reticle (usually the lower side) through the transparent design to reproduce the design on an object lens or other transparent member within the field of vision of the instrument beyond the opposite or upper face of the reticle. Under some operating conditions direct rays of the sun enter through the object lens and converge on the reticle with the result that the latter is heated to a temperature so high as to cause rapid deterioration of reticles of the composite type such as those constructed from metal films on supporting glass. By constructing our reticles from tough, malleable metal, such as copper, we afford adequate resistance to such high temperatures and at the same time impart ample strength to withstand vibrations and sudden pressure variations to which the reticles are subjected. For most uses the thickness of our copper reticle need not exceed approximately 6/1000 of an inch.

It is an object of the present invention to provide an improved homogeneous reticle having transparent lines and/or other perforations of the requisite fineness, accurately located and clear cut.

A further object is to provide reticles which are adapted to be formed from thin sheets of metal in an economical manner suited to large scale commercial production.

Our preferred procedure for the manufacture of such devices includes photo-mechanical layout of groups of the blanks and reproduction of the designs on the blanks followed by etching procedure to form both the transparent designs and peripheries of the reticles in accurate predetermined relation to the designs.

Referring to the accompanying drawings:

Figure 1 is a front elevation showing one of our improved reticles of the flat type;

Fig. 2 is a cross section through the same;

Fig. 3 is a plan view of one of our concavo-convex reticles;

Fig. 4 is a cross sectional view of the reticle shown in Fig. 3;

Fig. 5 is a plan view illustrating one of the steps in our process for photo-mechanically printing the designs and outlines of a group of reticles on a metal blank;

Fig. 6 is a vertical section through the negative envelope and blank shown in Fig. 5;

Fig. 7 is a fragmentary, sectional view on a greatly enlarged scale illustrating one of the steps in the formation of a transparent line in a flat blank;

Fig. 8 is an enlarged sectional view illustrating one of the steps in the process for forming a dish shaped or concavo-convex reticle;

Figure 9:
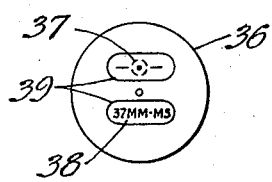
Fig. 9 is a front elevation showing a type of reticle which is formed on a thicker metal blank.

The reticle illustrated in Figs. 1 and 2 comprises a thin metal body 10 of uniform thickness throughout and having sufficient rigidity to be self-sustaining when supported at its perimeter in an instrument such as a gun sight or the like. Where the smaller reticles are constructed from copper adequate strength and rigidity may be imparted by using sheets from 2/1000 to 6/1000 of an inch in thickness. The reticle illustrated in Figs. 1 and 2 has a circular design comprising arcuate line segments 11 extending through the body 10 and a minute central perforation 12. This design has transparent lines the width of which are equal to approximately 1/1000 of an inch. The ends of the arcuate segments 11 are separated by filaments of metal which support the circular center portion.

The larger reticle shown in Figs. 3 and 4 comprises a concavo-convex disk 13 formed with transparent lines 14 some of which are disposed radially and others having arcuate segments disposed in concentric circles around a minute central perforation 15. The arcuate line segments are separated from the radial lines by filaments of metal and similar filaments interrupt the inner circle of the design to support the central portion of the reticle. The disk 13 is of uniform thickness, preferably equal to about 6/1000 of an inch, and the width of the lines of the design may be as fine as desired with a lower limit of approximately 1/1000 of an inch. It will be understood that reticles of numerous other shapes, thicknesses and sizes and with a great variety of designs may be provided within the spirit of our invention.

According to our preferred procedure, pure copper sheets of convenient size for handling (approximately eighteen inches square, for example) and of uniform thickness equal to that of the reticles required are burnished to give them clean, fine-toothed surfaces and are then coated on both faces with a light-sensitive enamel. Either a cold top or hot top enamel may be employed. A suitable cold top enamel may be composed of the following ingredients in the proportions indicated:

| | |
|---|---|
| Water | ounces__ 160 |
| Ammonium carbonate | do____ 3½ |
| Orange shellac | pound__ 1 |
| Ammonium bichromate | grains__ 360 |

The coating must be uniform and of substantial thickness. To produce this, the liquid composition is applied while the copper sheet is mounted on a spinner rotating in a horizontal plane and while warm air is directed against the face of the sheet to dry the composition. A plurality of coats of the enamel are usually required, each one being dried before the subsequent coat is applied. The coated sheet is then cut into smaller rectangles of sizes convenient for handling and with a view to producing a maximum number of reticles on each metal blank.

For use in contact printing of the outlines and designs for a group of reticles, suitable transparent negatives are prepared photographically from accurate line drawings in accordance with procedure which is well known in the art. Duplicate negatives are superimposed one on the other with the reticle outlines and designs of the respective negatives in registry with each other. These superimposed negatives are then fastened together along opposite margins to form an envelope for one of the metal blanks. A typical arrangement of the negatives and blanks is illustrated in Figs. 5 and 6 of the drawing wherein negatives 16 and 17 are shown superimposed one on the other with the outlines and designs for four reticles in registry with each other. Adhesive strips 18 extend along the ends of the negatives to fasten them together, leaving an opening along a longitudinal margin to admit a metal blank 21 between the negatives. The lines on the negatives representing the peripheries of the reticles are indicated by the numerals 19 and the interior designs, which must be accurately located with respect to the periphery, are indicated by the numerals 20. To temporarily fasten the blank 21 within the envelope formed by the negatives, in proper relation to the several designs, suitable adhesive tape members 22 may be employed. These are affixed to the outer face of the negative 17 over triangular openings 23 formed therein so that the inner, adhesive coated surfaces of the members 22 make contact with the metal blank to hold it in fixed relationship to the negatives. With a 45 ampere lamp at a distance of 35 to 36 inches, exposure of the negatives for from two to four minutes has been found to be sufficient in most cases. Such exposure renders the exposed area of the cold top enamel insoluble to the developing solution which is subsequently applied but leaves the images of the designs and outlines of the individual reticles in soluble condition. The lines are then developed by thorough washing in a solution such as the following in the proportions indicated:

| | |
|---|---|
| Denatured alcohol (Formula #5) | gallons__ 5 |
| Malachite, green | grains__ 200 |
| Distilled water | ounces__ 32 |

This is applied until the lines appear sharp and clean on the blank which is then washed in water and dried. The lines are now ready for etching into the metal.

It will be evident that the selection of the reagent for etching is dependent on the character of the material comprising the blank. Where the latter is made of copper, the operator may apply a protective coating of asphaltum or other resist to the edges and one face of the blank and a number of the blanks may be temporarily attached to a supporting plate of glass or other suitable material using the asphaltum as an adhesive and leaving one face of the blanks exposed for the first etching treatment. The work is now placed in an etching machine wherein ferric chloride is used to etch the lines to a predetermined, uniform depth and to define the width of the lines on the exposed, enamel-coated face. Fig. 7 of the drawing illustrates a fragmentary part of the assembly of the work on a glass plate 24 and with the thickness of the various materials greatly enlarged for clearness, but not necessarily to scale. As here shown, a fragment of the metal blank 21 has the cold top enamel coating 25 on both faces and the asphaltic masking material 26 covers one face and constitutes an adhesive for securing the blank to the plate 24. One of the lines 28 is shown as having been etched part way into the blank 21 while one of the photo-printed lines 27 on the opposite face of the blank is shown in registry with the partially etched line.

Use of ferric chloride of 40 degrees Baumé test for a period of 2 to 5 minutes is usually sufficient to cause the lines to penetrate the desired depth into the metal. By careful control of the time, both the width and depth of penetration is regulated to give any desired width of line. For flat reticles, such as those shown in Figs. 1 and 2, the etching from one face is extended approximately half way through the metal blank and then the blank is reversed on the supporting plate, the asphaltic masking material is removed from the outer, unetched face and then the lines on this face are etched until the complete transparent design and the circles defining the peripheries of the individual blanks are caused to completely penetrate the metal. In some cases the final finishing to insure uniformity in the width of lines is carried out manually by the use of a fine brush and the etching solution. The resulting work is placed in a cleaning solution such as trichlorethylene which is finally removed by washing in a caustic solution followed by a water bath. Where non-reflecting surfaces are required, the blanks are oxidized by immersion in suitable sulphur compound which is also washed off after a short period of immersion.

It will be evident that the groups of blanks may be retained intact until the etching from the second face of each has been completed. This greatly facilitates the handling of a large number of the reticles. Since the outer peripheries of the individual reticles are formed by the etching procedure simultaneously with the etching of the transparent lines of the interior design, we insure not only the accurate sizing of the blanks but also the accurate location or centering of the transparent lines with respect to the periphery.

Our procedure for making the concavo-convex or dish shaped reticles, exemplified by the one illustrated in Figs. 3 and 4, is like that hereinbefore described with reference to the flat reticles up to and including the mounting of the flat blanks on the supporting plate preparatory to etching. To proceed from this point, we etch the design and outline of the several reticles on a blank part way into one face. The fine line design is preferably caused to penetrate to a depth of about one-third of the thickness of the blank and then masking material is applied to the design and this is followed by etching of the outlines or peripheries of the several reticles completely through the metal thus forming individual flat blanks. These blanks are then removed from the supporting plate and are severally shaped to the desired curvature using a simple press having mating dies accurately fitting the periphery and both faces of the individual blanks. Each blank is placed in the press with its etched face in contact with the convex die member. This minimizes distortion of the partially etched design during the shaping operation so that accuracy is not materially affected.

The succeeding step in the operation is illustrated in Fig. 8 wherein the dish shaped blank 29 is shown with its enamel coating 30 and with the partially etched lines 31 located at the concave face. As further illustrated, the blank is attached to a supporting plate 32 of glass or other translucent material using a filling of translucent wax 33 between the concave face of the blank and plate and with suitable masking material 34 to protect the periphery of the blank from the etching solution which is subsequently applied. The assembly including the blank, together with others similarly mounted on the plate 32, is next placed in the etching machine where the openings 35 representing the design in the enamel coating at the convex face of the blank allow the etching to proceed completely through the blank. The etching is continued until the designs appear clear-cut and transparent. The end point may be readily determined by inspection where the support 32 as well as the wax masking material 33 are translucent. With a light beneath the plate 32 the operator inspects the transparent lines by observation through a magnifying glass at the opposite or convex face of the blank. Without removing the several reticles from the glass support slight irregularities in the lines may be corrected by the use of a sharp instrument or by manual etching as required. The final cleaning operation and, where required, the oxidation of the surfaces may be accomplished as described with reference to the flat reticles.

By constructing our reticles from sheet metal of uniform thickness throughout and only thick enough to constitute a self-sustaining unit, we greatly facilitate the precise formation of fine line designs wherein uniformity of width and clarity of lines is maintained. This feature has the further advantage of minimizing the time required for etching and amount of etching solution used in the process. We also reduce the cost of manufacture by our use of duplicate negatives to photo-print both faces of a large number of blanks simultaneously and by using the flat negatives for printing both the plane and dish shaped reticles, including reticle outlines. By die-shaping the concavo-convex blanks after the design has been etched on the concave face and by subsequently completing the etching from the convex face, the procedure is simplified without losing accurate control of the width of the lines and other dimensions of the design or causing detrimental distortion during the shaping.

Where the lines are to be formed by etching procedure as hereinbefore described, a practical upper limit for the thickness of the metal blanks is equal to approximately $2/100$ of an inch since irregular lines result if it is attempted to etch lines from either face to a depth greater than about $1/100$ths of an inch. The lower limit of thickness of metal is dependent on the diameter of the reticles and condition where it is to be used, but experience indicates that with presently available and suitable metals, thickness of less than $2/1000$ of an inch would render the devices insufficiently rigid to be self-sustaining under ordinary conditions of use.

Figure 10:
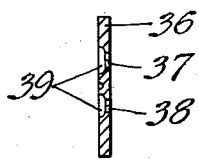
Fig. 10 is a central vertical section through the reticle shown in Fig. 9.

The reticle shown in Figs. 9 and 10 comprises a metal disk 36 which is substantially thicker and more rigid than those shown in Figs. 1 to 4, inclusive. A disk approximately an eighth of an inch thick, for example, may be used. A fine, transparent network of lines or designs, indicated generally by the numeral 37, is cut through the metal of the disk and in some cases other fine line perforations, such as the legend 38, may also be cut through the disk according to our invention. The thickness of the material 39 immediately adjacent to the legend and design is greatly reduced being preferably from $3/1000$ to $2/100$ of an inch in thickness.

Figure 11:
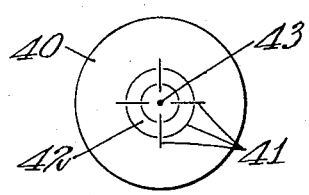
Fig. 11 is a front elevation showing another form of reticle.
Figure 12:
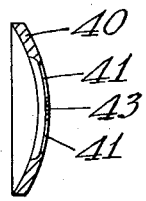
Fig. 12 is a central vertical section through the device shown in Fig. 11.

The reticle shown in Figs. 11 and 12 comprises a metal body 40 of dish shape having the inner and outer faces which are respectively concavely and convexly spherical, or of other desired shape. A fine line design 41 consisting of radially extending and arcuate, concentric lines, extends through a central portion 42 of the body 40 which is reduced to the desired thickness of from $3/1000$ to $2/100$ of an inch. In addition to the several fine lines of design 41, the body 40 has a minute central perforation 43. The segments of the central portion 42 are connected together by filaments of metal along opposite sides of the radial lines shown.

Our procedure to form the fine lines, perforations or other design on the selected areas of the thicker metal blanks will be understood from the following detailed description. The blank is ordinarily die cut from sheet or plate metal to the desired size and where required is shaped by suitable forming and stamping operations followed by buffing to produce smooth faces. These are then burnished with a fine abrasive to give fine toothed surfaces. At least one of these surfaces is then rendered light sensitive by applying a solution of either cold top or hot top enamel, as hereinbefore described, each coat of the solution being dried before the subsequent coat is applied.

Subsequently the required design is projected on the sensitized coating thus formed on the blank by the use of a transparent negative. For this purpose a photograph of a drawing of the desired design may be prepared in such manner that a silver emulsion capable of being "stripped" or transferred to a previously prepared negative support is produced according to conventional practice. For accuracy the negative must be shaped to fit the metal blank before the silver emulsion is transferred to it. As the negative support, a disk of transparent Celluloid or other suitable plastic material may be used. After heating the plastic disk to soften it, it is placed under pressure between two of the stamped out metal blanks with which it is to be used and is allowed to set in this shape. To a face of this support the design in the form of a silver emulsion transfer is "stripped" to complete the negative.

After this negative has dried it is held in contact with the sensitized coating of the metal blank in a suitable vacuum frame. Firm, uniform contact is thus maintained between the negative and the light sensitive coating on the metal blank while the design is reproduced on the coating by exposure of the negative and blank under an arc lamp of suitable power. With a 45-ampere lamp at a distance of thirty-five to thirty-six inches, exposure of the negative for from two to four minutes has been found to be sufficient. Such exposure renders the exposed area of the cold top enamel insoluble to the developing solution which is subsequently applied, but leaves the image of the design in a soluble condition. The fine line design is then developed by applying a solvent such as that described with reference to the thinner blanks. This is applied until the image appears sharp and clean on the blank which is then washed in water and dried. The image is now ready for etching into the metal.

Where the blank is made of copper, a protective coating of asphaltum or other resist is next applied to the edges and back face of the blank which have not previously been covered with the enamel, leaving the design open for etching. The work is then placed in an etching machine and etched with a suitable reagent. The etching is thus caused to penetrate the surface of the metal to a depth of from $2/1000$ to $1/100$ of an inch. It has been found that the required accuracy, uniformity and fineness of line cannot be obtained if the etching is allowed to penetrate the metal to a greater depth.

Figure 13:
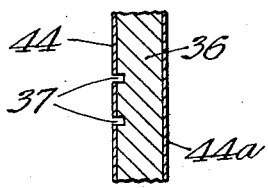
Figs. 13, 14 and 15 are fragmentary vertical sections, on a greatly enlarged scale, illustrating successive steps in our procedure for forming fine, clear cut designs or perforations in the thicker blanks of Figs. 9 to 12 inclusive.
Figure 14:
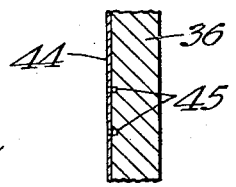
Figure 15:
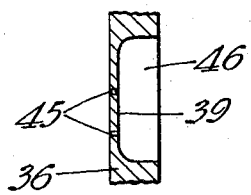

Fig. 13 of the drawing illustrates the blank 36 with the design 37 etched into the metal face with its enamel coat 44, the back face of the blank having the asphaltum coating 44a. Proceeding with the etched blank, the lines are filled with a protecting paint or mastic 45, such as asphaltum, and the asphaltum or other resist is removed from the back of the blank as shown in Fig. 14. Now the thickness of the blank directly back of the design is reduced, preferably by etching procedure. With a copper blank ferric chloride of the same grade as that used in etching the design on the front of the blank may be used on the back face. The etching from the back is carried to the point where the black of the asphaltum filling 45 begins to show through. Using a fine brush, the operator may manually complete the operation by applying ferric chloride until all of the lines appear uniformly and sharp in black. The recess formed by etching from the back is indicated by the numeral 46 in Fig. 15, this recess extending in from the back so that it intersects or exposes the design from the back. This leaves metal in the immediate vicinity of the design equal to the depth of the etching, or from $2/1000$ to $1/100$ of an inch thick. Finally the blank is placed in a cleaning solution adapted to dissolve the asphaltum filling for the design as well as the other staging material or enamel. By holding this finished reticle to the light the entire design appears fully open and sharp.

Where extremely fine and perfectly clear cut lines are not required and where the thickness of metal need not exceed .01 inch, our process may be carried out entirely from one face of the blank, the design being photo-printed thereon, developed and then etched while the other face of the blank is merely masked. Thus the transparent designs may be formed in a number of blanks in one etching operation and without removing them from a common support.

To increase the illumination of the image it is sometimes desirable to form a highly light-reflecting surface on the face which is to be exposed to artificial light. This may be accomplished by coating or plating on a white metal, such as silver, after the design has been etched through and while protecting the lines or perforations by the use of a filling of suitable masking material. For example, electro-plating with silver in this manner gives the desired reflecting surface without detracting from the clarity of the design.

The present application is a continuation in part of our abandoned application Serial No. 460,822, filed October 5, 1942, for Reticle and process for making the same, and is a division of our abandoned application Serial No. 497,486, filed August 5, 1943.

We claim:

1. A reticle comprising, a unitary body of metal formed with fine, sharp, elongated perforations not exceeding .01 inch in width, defining a light-pervious design on an opaque field, the thickness of said body over the area of said design not exceeding .02 inch and selected perforations being separated by minute reinforcing filaments of metal, the filaments being integral with the body.

2. A reticle comprising, a unitary metal body of self-sustaining thickness formed with fine, sharp, arcuate perforations defining separate segments of a circular, light-pervious design on an opaque field the ends of said segments being separated by minute filaments of metal, the filaments being integral with the body, whereby the central portion of the body is supported.

3. A reticle comprising, a unitary metal disk of self-sustaining thickness having fine, sharp, arcuate perforations not exceeding .01 inch in width, defining separate segments of a circular, light-pervious design disposed concentrically to the periphery of the disk, the ends of the several segments being separated by minute filaments of metal supporting the central portion of the disk.

4. A reticle comprising, a unitary metal body having a thin central portion not exceeding .02 inch in thickness and a relatively thick, integral peripheral portion, the relatively thin central portion being formed with fine, elongated perforations not exceeding .01 inch in width, defining a light-pervious design on an opaque field.

5. A reticle comprising, a unitary metal body of concavo-convex shape formed with fine, sharp perforations not exceeding .01 inch in width, defining a light-pervious design on an opaque field.

6. A reticle comprising, a unitary metal body of self-sustaining thickness and concavo-convex shape formed with fine, sharp, arcuate perforations not exceeding .01 inch in width, defining separate segments of a circular, light-pervious design on an opaque field, said design being interrupted by minute filaments of metal supporting the central portion of the body.

NORMAN B. MEARS.
HARVEY T. HOLSAPPLE.

REFERENCES CITED

The following references are of record in the file of this patent:

UNITED STATES PATENTS

| Number | Name | Date |
| --- | --- | --- |
| 378,423 | Baynes | Feb. 28, 1888 |
| 1,380,333 | Rosales | May 31, 1921 |
| 1,958,456 | Warrens | May 15, 1934 |
| 2,177,094 | Carter | Oct. 24, 1939 |
| 2,339,723 | Russell | Jan. 18, 1944 |